(12) United States Patent
Krug et al.

(10) Patent No.: US 9,103,369 B2
(45) Date of Patent: Aug. 11, 2015

(54) BEARING ASSEMBLY

(75) Inventors: Udo Krug, Theres (DE); Armin Olschewski, Schweinfurt (DE); Armin Schlereth, Schweinfurt (DE); Arno Stubenrauch, Aidhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 103 days.

(21) Appl. No.: 14/008,621

(22) PCT Filed: Mar. 22, 2012

(86) PCT No.: PCT/EP2012/055043
§ 371 (c)(1),
(2), (4) Date: Aug. 1, 2014

(87) PCT Pub. No.: WO2012/130700
PCT Pub. Date: Oct. 4, 2012

(65) Prior Publication Data
US 2014/0334756 A1    Nov. 13, 2014

(30) Foreign Application Priority Data

Mar. 31, 2011 (DE) .......................... 10 2011 006 466
May 19, 2011 (DE) .......................... 10 2011 076 107

(51) Int. Cl.
| | | |
|---|---|---|
| *F16C 35/077* | (2006.01) | |
| *F16C 17/22* | (2006.01) | |
| *F16C 19/36* | (2006.01) | |
| *F16C 25/08* | (2006.01) | |
| *F16C 27/04* | (2006.01) | |
| *F16C 19/52* | (2006.01) | |
| *F16C 19/54* | (2006.01) | |
| *F16C 33/66* | (2006.01) | |

(52) U.S. Cl.
CPC ............... *F16C 17/22* (2013.01); *F16C 19/364* (2013.01); *F16C 19/525* (2013.01); *F16C 19/54* (2013.01); *F16C 19/542* (2013.01); *F16C 25/08* (2013.01); *F16C 27/04* (2013.01); *F16C 33/66* (2013.01); *F16C 35/077* (2013.01); *F16C 2229/00* (2013.01); *F16C 2300/02* (2013.01); *F16C 2360/31* (2013.01)

(58) Field of Classification Search
CPC ... F16C 35/077; F16C 19/525; F16C 2229/00
See application file for complete search history.

(56) References Cited

U.S. PATENT DOCUMENTS

| | | | | |
|---|---|---|---|---|
| 2,314,622 A | * | 3/1943 | Klamp | 384/563 |
| 5,067,827 A | * | 11/1991 | Bokel | 384/537 |
| 5,887,984 A | * | 3/1999 | Duval | 384/477 |

FOREIGN PATENT DOCUMENTS

| | | |
|---|---|---|
| DE | 582962 A | 9/1933 |
| DE | 1006318 A | 4/1957 |

(Continued)

*Primary Examiner* — Thomas R. Hannon
(74) *Attorney, Agent, or Firm* — Bryan Peckjian; SKF USA Inc. Patent Dept.

(57) ABSTRACT

A bearing assembly includes two tapered roller bearings having inner and outer rings and tapered rollers therebetween. The inner rings are mounted to a first machine part, and the outer rings are mounted on an adapter sleeve on a second machine part. The adapter sleeve has a first end axially fixed relative to the second machine part and a second end axially spaced from an axial stop of the second machine part by an axial gap. At a non-operating temperature, such as 20° C., the gap has a width of about 30 μm to 250 μm, and at an operating temperature of over 50° C. the gap disappears and the second end contacts the axial stop. The width of the gap at the non-operating temperature is selected to produce a predetermined preload on the bearing assembly at the operating temperature.

16 Claims, 3 Drawing Sheets

(56) References Cited

FOREIGN PATENT DOCUMENTS

| | | | |
|---|---|---|---|
| DE | 19818634 | A1 | 11/1999 |
| FR | 992298 | A | 10/1951 |
| JP | 3249420 | A | 11/1991 |
| WO | 2006092256 | A1 | 9/2006 |
| WO | 2008011400 | A2 | 1/2008 |

\* cited by examiner

BEARING ASSEMBLY

CROSS-REFERENCE

This application is the U.S. National Stage of International Application No. PCT/EP2012/055043 filed on Mar. 22, 2012, which claims priority to German patent application no. 10 2011 006 466.4, filed Mar. 31, 2011, and to German patent application no. 10 2011 076 107.1 filed May 19, 2011.

TECHNICAL FIELD

The invention relates to a bearing assembly comprising two tapered roller bearings, and, more specifically, to a bearing assembly that includes a gap at room temperature which gap closes when the bearing assembly heats up in order to produce a bearing preload.

BACKGROUND

DE 582 962 A, DE 1 006 318 A and WO 2006/092256 A1 disclose a bearing assembly of the above-described type. JP 032 49 420 A and WO 2008/011400 A2 show further solutions.

Tapered roller bearings of this type are used in diverse applications, and it is often necessary to apply a defined axial preload between the two tapered roller bearings to help ensure a stable radial and axial support. The setting of the correct preload often has a high cost. In order to ensure an optimal support, it is important here that the preload is neither too high nor too low. The fact that the magnitude of the preload also depends on the current temperature of the bearing assembly is another problem that must be considered.

SUMMARY

The object underlying the present invention is to further develop a bearing assembly of the above-described type such that the setting of an axial preload is possible in a simpler manner. It is desired in particular here that the preload automatically builds up in a desired manner in accordance with the operating temperature of the bearing assembly. This is interesting in particular in large bearing applications, such as for example in bearing assemblies of the rotors of wind turbines.

The solution of this object by the invention is characterized in that at room temperature a gap is present, measured in the direction of the axis, between the end surface of the section and the axial stop on the first or second machine part, which gap is between 30 μm and 250 μm, wherein at an increased operating temperature of the bearing assembly, the gap provided between the end surface of the section and the axial stop is reduced to zero by the heat-induced expansion of the bearing assembly.

The adapter sleeve here preferably supports the two outer rings of the two tapered roller bearings. The two tapered roller bearings can be positioned in X-arrangement.

At 20° C. the gap is preferably between 30 μm and 250 μm, more preferably between 50 μm and 150 μm, wherein it is reduced to zero at an operating temperature of more than 50° C.

The adapter sleeve can have a resilient section at least in its portion between the two cylindrical seats for the bearing rings. The resilient section causes the desired heat-induced expansion to not be influenced by regions of the adapter sleeve which need not expand due to heat. The resilient section of the adapter sleeve can be formed by a reduction of the wall thickness of the adapter sleeve. Alternatively or additively it can be provided that the resilient section of the adapter sleeve is formed by openings which are introduced into the adapter sleeve. These openings can be formed by bores radially penetrating through the adapter sleeve.

The adapter sleeve can further include friction-reducing means in a contact region between the adapter sleeve and the first or second machine part, and/or between the adapter sleeve and a bearing ring. These means can be formed by at least one annular groove which is machined into the adapter sleeve on a radially-inner-lying or radially-outer-lying cylindrical surface, wherein a lubricant, in particular grease or graphite, is introduced into the annular groove.

The adapter sleeve is preferably comprised of a material having a high thermal expansion coefficient, in particular of aluminum, magnesium, copper, or brass.

With the proposed solution it is possible to prefabricate and to assemble the bearing components in such a manner that initially—at room temperature—no preload is present between the two tapered roller bearings, and that then, however, a desired preload is present at an expected operating temperature.

The adapter sleeve can be disposed between a to-be-supported rotor and the inner rings of the tapered roller bearing. Similarly it is also possible that the outer rings of the tapered roller bearing are held by the adapter sleeve, wherein the adapter sleeve is then disposed in a housing part.

BRIEF DESCRIPTION OF THE DRAWINGS

An exemplary embodiment of the invention is illustrated in the drawings.

DETAILED DESCRIPTION

Figure 1:
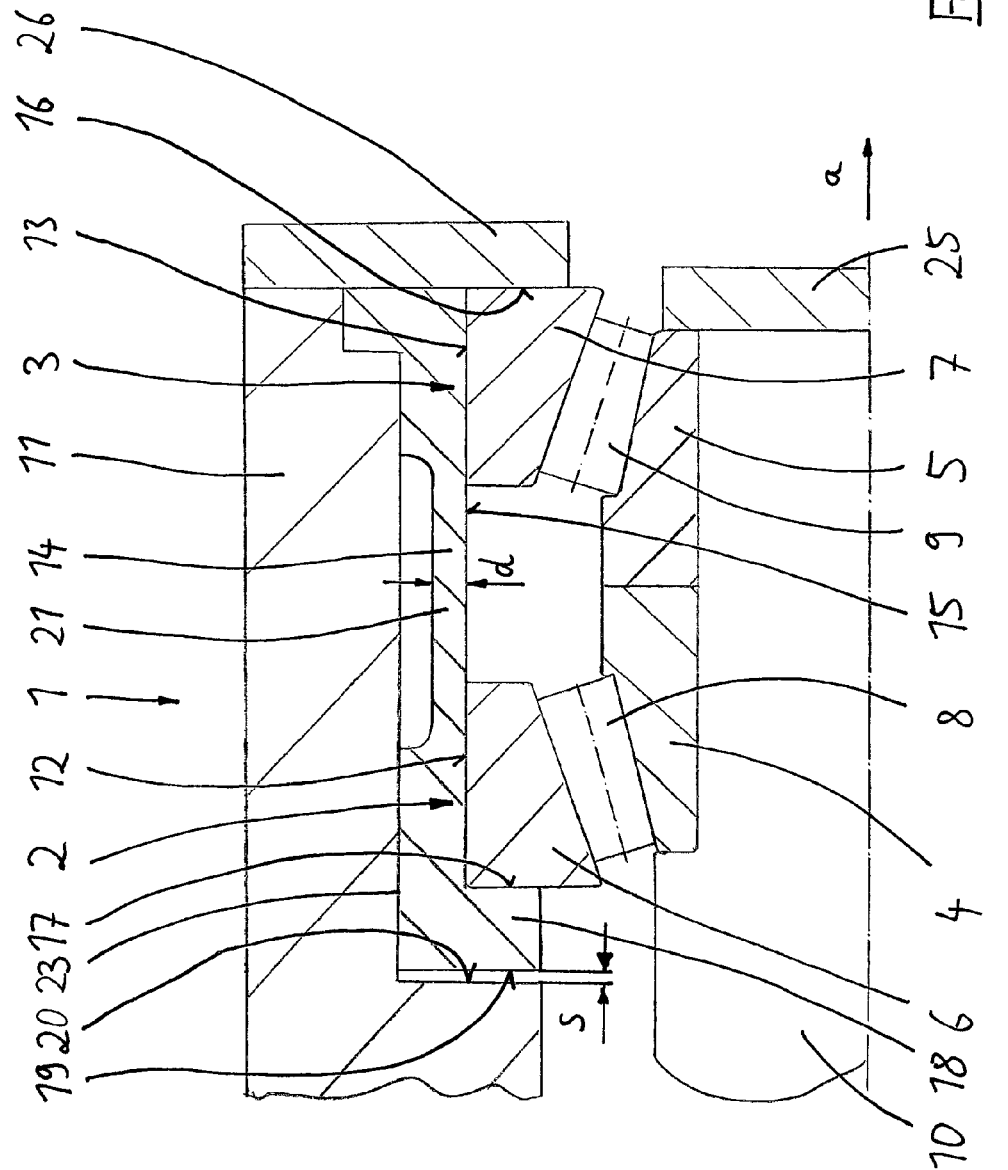
FIG. 1 shows the radial section through a bearing assembly, including two tapered roller bearings which support a shaft relative to a housing.

In FIG. 1 a bearing assembly 1 can be seen which includes two tapered roller bearings 2, 3. The two tapered roller bearings 2, 3 each have, in a known manner, an inner ring 4 or 5, an outer ring 6 or 7, and tapered roller rows 8, 9 disposed between the rings. The bearing assembly 1 supports a first machine part 10 in the form of a rotating shaft relative to a second machine part 11 in the form of a housing. The axis of rotation of the shaft 10 is designated with a.

While the two bearing inner rings 4, 5 are disposed directly on the shaft 10, the two bearing outer rings 6 and 7 are held by an adapter sleeve 14. For this purpose the adapter sleeve 14 has a cylindrical counter-seat 15, which is provided to hold the cylindrical seats 12 and 13 of the two outer rings 6, 7.

The bearing inner rings 4, 5 are fixed on the shaft 10 by an end part 25.

The bearing outer ring 7 sits radially indirectly in the housing 11; however it abuts axially on a first axial stop 16, which is formed from an end part 26 that is fixed to the housing 11.

The other bearing outer ring 6 likewise sits radially indirectly in the housing 11. However it does not also directly axially abut (in FIG. 1 left) on the housing 11, but rather on an axial stop 17, which is formed from a radially-reduced section 18 of the adapter sleeve 14. This section extends over a longitudinal extension towards the axis a before an end surface 19 terminates the adapter sleeve 14. This end surface 19 is provided to come into abutment on an axial stop 20 of the housing 11 during operation of the bearing assembly. At room temperature, however—as shown greatly exaggerated in FIG. 1—a gap s is present between the surfaces 19 and 20.

If in particular the shaft 10 heats up during operation, it expands as a result in the axial direction a. The axial-expanding shaft 10 drives the two bearing outer rings 6, 7 away from each other, which axially expands the adapter sleeve 14. Accordingly the gap s becomes smaller, until it finally becomes zero; with further heating the thermal expansion of the shaft 10 is transmitted via the bearings 2, 3 to the adapter sleeve 14, so that the end surface 19 of the section 18 axially presses on the stop 20, so that the two tapered roller bearings 2, 3 become preloaded in the axial direction.

So that the right-side region in FIG. 1 of the adapter sleeve 14 remains largely uninfluenced thereby and does not hinder the desired temperature-induced length change, the central portion of the adapter sleeve 14 is provided with a resilient section 21.

Figure 2:
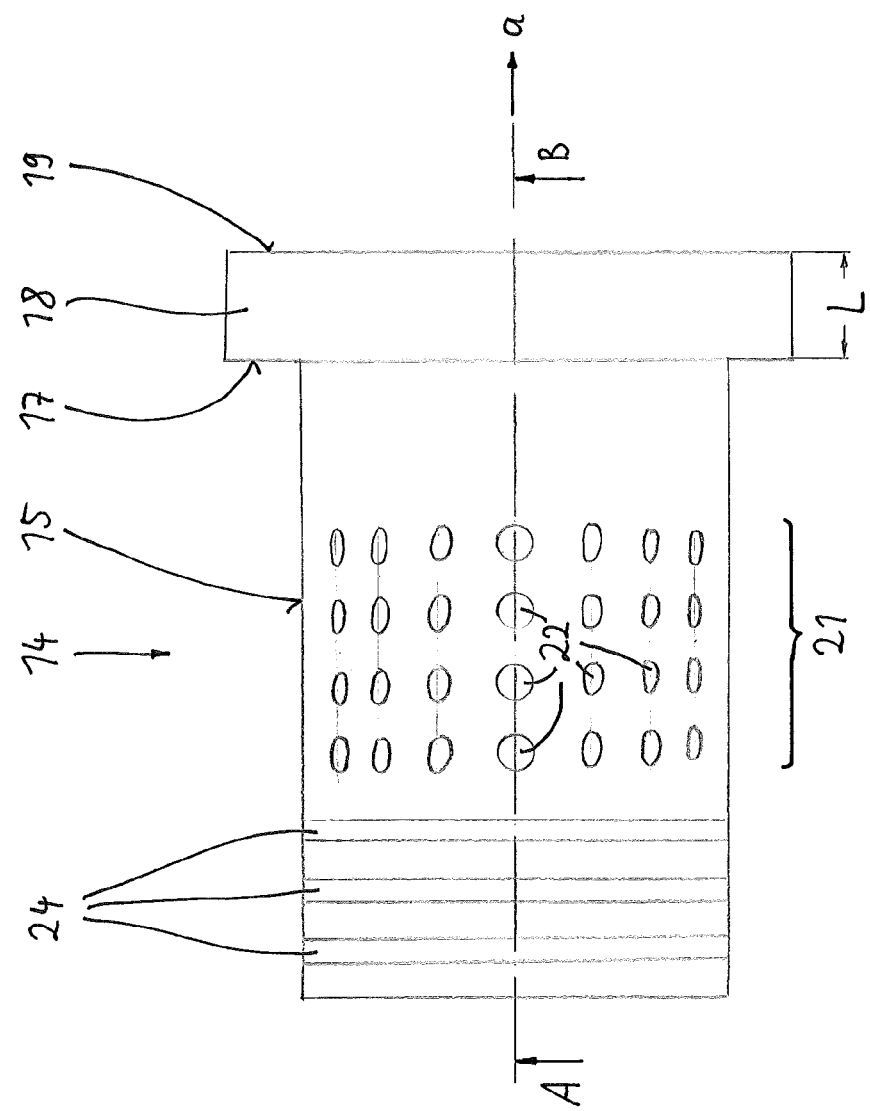
FIG. 2 shows the side view of a rotationally-symmetric adapter sleeve which is part of the bearing assembly.
Figure 3:
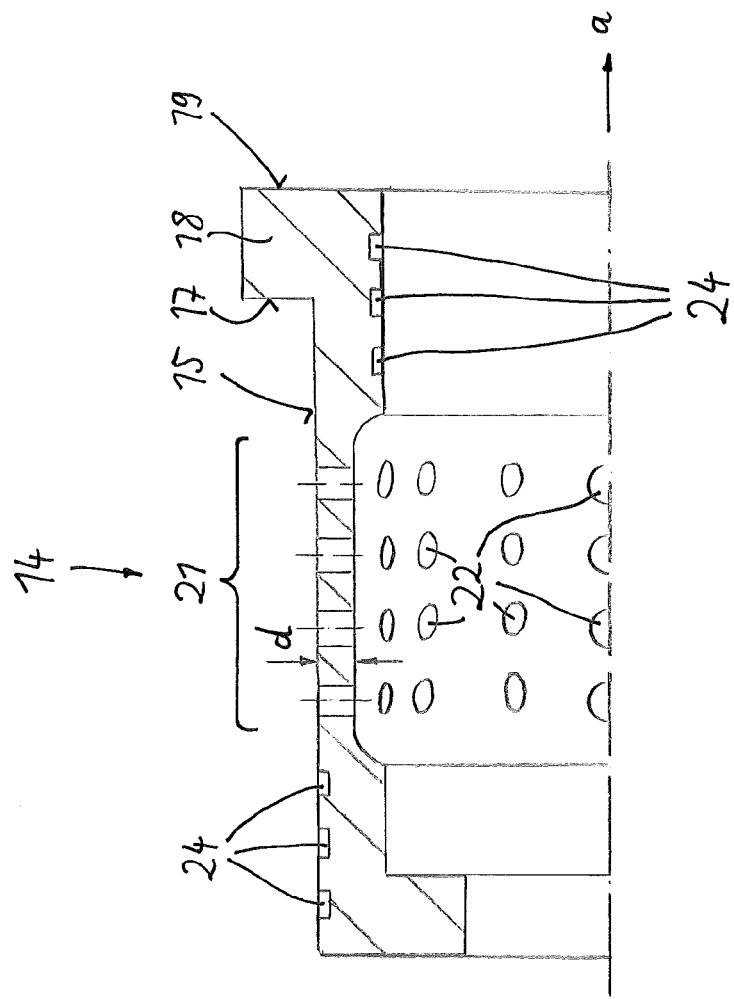
FIG. 3 shows the section A-B through the adapter sleeve.

The design of this section 21 is best seen from FIGS. 2 and 3. Accordingly the wall thickness d of the adapter sleeve 14 is initially reduced in this portion, which makes the central part of the adapter sleeve per se more elastic, i.e. more flexible. Then, openings 22 in the form of bores are introduced in the central region, which openings 22 cause an additional weakening of the material and thus lend a defined resilience to the central portion of the adapter sleeve 14.

A plurality of bores 22 are disposed axially adjacent to one another; furthermore a plurality of bores are disposed equidistantly in the circumferential direction of the adapter sleeve 14.

Furthermore, means 24 are provided which ensure that, in defined contact regions 23 between adapter sleeve 14 and housing 11, the temperature-induced and desired lengthenings of the components are not hindered. In the exemplary embodiment, these means are comprised of annular grooves which are filled with a medium which increases the sliding properties, e.g. graphite or grease. It can also be a sliding material, as is used in sliding bearing construction.

In the exemplary embodiment the tapered roller bearings 2, 3 are thus positioned in X-arrangement, wherein the outer rings 6, 7 are carried by the adapter sleeve 14. At room temperature (20° C.), the gap is in the region of 100 μm. Accordingly, at room temperature the bearing assembly is not preloaded. During operation, the bearing assembly and in particular the shaft 10 become warm, so that they expand axially. Accordingly, the gap shrinks to zero and the surfaces 19 and 20 press against each other. The bearing assembly is thereby axially preloaded.

The dimensions of the adapter sleeve as well as the material parameters, in particular the thermal expansion coefficient, are chosen such that with the expected heating during operation a sufficient axial change in length takes place, which not only makes the gap s zero, but also builds up the desired preload. Here it can be provided that the dimensions and materials are chosen such that with the expected temperature difference between operating temperature and ambient temperature, a change in length of the adapter sleeve 14 of approximately 100 to 250 μm results.

The adapter sleeve 14 thus has cavities (in this case the annular grooves 24) filled with sliding material (e.g. graphite or lubricant, in particular grease). Furthermore, as described the adapter sleeve 14 has a portion with lesser wall thickness which acts as a spring, i.e. it reduces the stiffness of the adapter sleeve 14 in the axial direction.

In order to achieve this elastic effect, the openings 22 are introduced in the adapter sleeve 14 in the form of the bores. This allows the resiliency to be controlled in a targeted manner.

REFERENCE NUMBER LIST

1 Bearing assembly
2 Tapered roller bearing
3 Tapered roller bearing
4 Inner ring
5 Inner ring
6 Outer ring
7 Outer ring
8 Tapered roller
9 Tapered roller
10 First machine part (shaft)
11 Second machine part (housing)
12 Cylindrical seat
13 Cylindrical seat
14 Adapter sleeve
15 Cylindrical counter-seat
16 Axial stop
17 Axial stop
18 Radially enlarged/reduced section
19 End surface of the radially enlarged section
20 Axial stop
21 Resilient section
22 Opening
23 Contact region
24 Friction-reducing means (filled annular groove)
25 End part
26 End part
a Axis/axial direction
s Gap
d Wall thickness

The invention claimed is:

1. A bearing assembly, comprising two tapered roller bearings, each including an inner ring, an outer ring, and tapered rollers disposed between the inner rings and the outer rings, wherein the inner rings are mounted in or on a first machine part and wherein the outer rings are mounted in or on a second machine part, wherein the inner rings or the outer rings include cylindrical counter-seats disposed on a cylindrical seat of an adapter sleeve supporting the rings, wherein the one bearing ring disposed on the adapter sleeve abuts directly or indirectly on an axial stop of the first or second machine part, wherein the other bearing ring disposed on the adapter sleeve abuts on an axial stop of the adapter sleeve, wherein the axial stop of the adapter sleeve is formed by a radially enlarged or reduced section of the adapter sleeve, wherein the section has an end surface on the side facing away from the bearing ring, which end surface lies opposite an axial stop on the first or second machine part, wherein
at room temperature of 20° C. a gap is present, measured in the direction of the axis, between the end surface of the section and the axial stop on the first or second machine part, which gap is between 30 μm and 250 μm, wherein at an increased operating temperature of the bearing assembly of greater than 50° C. the gap provided between the end surface of the section and the axial stop is reduced to zero by the heat-induced expansion of the bearing assembly.

2. The bearing assembly according to claim 1, wherein the adapter sleeve supports the two outer rings of the two tapered roller bearings.

3. The bearing assembly according to claim 2, wherein the two tapered roller bearings are positioned in X-arrangement.

4. The bearing assembly according to claim 1, wherein at 20° C. the gap is between 50 μm and 150 μm.

5. The bearing assembly according to claim 1, wherein the adapter sleeve has a resilient section at least in its portion between the two cylindrical seats for the bearing rings.

6. The bearing assembly according to claim 5, wherein the resilient section of the adapter sleeve is formed by a reduction of the wall thickness of the adapter sleeve.

7. The bearing assembly according to claim 5, wherein the resilient section of the adapter sleeve is formed by openings, which are introduced into the adapter sleeve.

8. The bearing assembly according to claim 7, wherein the openings are formed by bores radially penetrating through the adapter sleeve.

9. The bearing assembly according to claim 1, wherein the adapter sleeve includes a friction-reducing means in a contact region between the adapter sleeve and the first or second machine part and/or between the adapter sleeve and a bearing ring.

10. The bearing assembly according to claim 9, wherein the friction-reducing means is formed by at least one annular groove which is machined into the adapter sleeve on a radially-inner-lying or radially-outer-lying cylindrical surface, and wherein a lubricant is introduced into the annular groove.

11. The bearing assembly according to claim 1, wherein the adapter sleeve supports the two outer rings of the two tapered roller bearings, wherein the two tapered roller bearings are positioned in X-arrangement, wherein at 20° C. the gap is between 50 μm and 150 μm, wherein the adapter sleeve has a resilient section at least in its portion between the two cylindrical seats for the bearing rings formed by a reduction of the wall thickness of the adapter sleeve, and wherein the resilient section includes a plurality of radial bores.

12. The bearing assembly according to claim 1, wherein a size of the gap at the room temperature is selected such that the two tapered roller bearing will have a predetermined preload at the operating temperature of the bearing assembly.

13. A bearing assembly having an axis of rotation and comprising:

a first tapered roller bearing having an inner ring, an outer ring and a first set of tapered rollers between the inner ring and the outer ring;

a second tapered roller bearing having an inner ring, an outer ring, and a second set of tapered rollers between the second tapered roller bearing inner ring and the second tapered roller bearing outer ring;

the first tapered roller bearing inner ring and the second tapered roller bearing inner ring being mounted to a first machine part;

the first tapered roller bearing outer ring and the second tapered roller bearing outer ring being mounted to a second machine part; and an adapter sleeve having a first end and a second end and a cylindrical seat, the adapter sleeve being mounted to the second machine part such that the first end is axially fixed relative to the second machine part and so that the second end is spaced from an axial stop of the second machine part by an axial gap, wherein the first tapered roller bearing outer ring and the second tapered roller bearing outer ring are mounted to the cylindrical seat, wherein at a non-operating temperature the gap has a width from about 30 μm to 250 μm, wherein at an operating temperature of over 50° C. the second end contacts the axial stop, and wherein the width of the gap at the non-operating temperature is selected to produce a predetermined preload on the bearing assembly at the operating temperature.

14. The bearing assembly according to claim 13, wherein the adapter sleeve has first and second end portions and a central portion radially thinner than either of the first and second end portions.

15. The bearing assembly according to claim 14, wherein the central portion includes a plurality of radial bores.

16. The bearing assembly according to claim 15, wherein the first and second end portions of the adapter sleeve each include at least one radially outwardly directed circumferential groove.

* * * * *